United States Patent
Noh et al.

(10) Patent No.: US 11,055,497 B2
(45) Date of Patent: Jul. 6, 2021

(54) NATURAL LANGUAGE GENERATION OF SENTENCE SEQUENCES FROM TEXTUAL DATA WITH PARAGRAPH GENERATION MODEL

(71) Applicant: NCSOFT Corporation, Seoul (KR)

(72) Inventors: Hyung Jong Noh, Seongnam-si (KR); Yeon Soo Lee, Seongnam-si (KR); Jun Yeop Lee, Seongnam-si (KR); Jung Sun Jang, Seongnam-si (KR)

(73) Assignee: NCSOFT Corporation, Seoul (KR)

( * ) Notice: Subject to any disclaimer, the term of this patent is extended or adjusted under 35 U.S.C. 154(b) by 0 days.

(21) Appl. No.: 15/852,403

(22) Filed: Dec. 22, 2017

(65) Prior Publication Data

US 2018/0189274 A1 Jul. 5, 2018

(30) Foreign Application Priority Data

Dec. 29, 2016 (KR) .......................... 10-2016-0182289

(51) Int. Cl.

| | |
|---|---|
| *G06F 40/237* | (2020.01) |
| *G06F 40/131* | (2020.01) |
| *G06F 40/56* | (2020.01) |
| *G06N 3/02* | (2006.01) |
| *G06N 3/08* | (2006.01) |
| *G06N 3/04* | (2006.01) |
| *G06F 40/10* | (2020.01) |

(52) U.S. Cl.
CPC .............. *G06F 40/56* (2020.01); *G06F 40/10* (2020.01); *G06N 3/0445* (2013.01); *G06N 3/0454* (2013.01); *G06N 3/0472* (2013.01); *G06N 3/084* (2013.01)

(58) Field of Classification Search
CPC .. G06F 17/277; G06F 17/2881; G06F 40/131; G06F 40/174; G06F 40/279; G06F 40/30; G06N 3/02; G06N 20/00
USPC ...................................... 704/1, 9; 706/15, 30
See application file for complete search history.

(56) References Cited

U.S. PATENT DOCUMENTS

| | | | | |
|---|---|---|---|---|
| 5,930,789 | A * | 7/1999 | Agrawal | G06F 16/2477 |
| | | | | 707/700 |
| 6,052,657 | A * | 4/2000 | Yamron | G06F 16/313 |
| | | | | 704/9 |
| 8,239,188 | B2 * | 8/2012 | Liu | G06F 17/2827 |
| | | | | 704/2 |
| 8,515,736 | B1 * | 8/2013 | Duta | G06F 40/30 |
| | | | | 704/9 |
| 9,473,637 | B1 * | 10/2016 | Venkatapathy | G06F 40/56 |
| 9,753,916 | B2 * | 9/2017 | Aharoni | G06F 17/2881 |
| 10,049,148 | B1 * | 8/2018 | Fang | G06F 16/285 |

(Continued)

OTHER PUBLICATIONS

"Long short-term memory", Wikipedia, 11 Pages, downloaded Oct. 23, 2019. (Year: 2019).*

*Primary Examiner* — Martin Lerner
(74) *Attorney, Agent, or Firm* — Sughrue Mion, PLLC

(57) ABSTRACT

Disclosed are an apparatus and method for generating a natural language. According to an embodiment of the present disclosure, the method for generating the natural language includes receiving a plurality of pieces of data, generating a sentence ID sequence including one or more sentence IDs from the plurality of pieces of data, and generating a sentence corresponding to each of the sentence IDs included in the sentence ID sequence from the sentence ID sequence and the plurality of pieces of data.

20 Claims, 8 Drawing Sheets

(56) References Cited

U.S. PATENT DOCUMENTS

| | | | |
|---|---|---|---|
| 10,083,169 B1* | 9/2018 | Ghosh | G06F 17/279 |
| 10,181,098 B2* | 1/2019 | Vinyals | G06F 17/28 |
| 10,387,560 B2* | 8/2019 | Allen | G06F 17/248 |
| 10,395,118 B2* | 8/2019 | Yu | G06N 3/084 |
| 10,489,719 B2* | 11/2019 | Yates | G06Q 30/0269 |
| 10,776,579 B2* | 9/2020 | Mishra | G06F 40/247 |
| 2001/0056445 A1* | 12/2001 | Meystel | G06F 40/35 715/234 |
| 2007/0244690 A1* | 10/2007 | Peters | G06F 40/30 704/8 |
| 2008/0133508 A1* | 6/2008 | Jiang | G06F 16/3347 |
| 2010/0211377 A1* | 8/2010 | Aoyama | G06F 17/2854 704/8 |
| 2010/0268711 A1* | 10/2010 | Liao | G06F 16/345 707/736 |
| 2011/0167027 A1* | 7/2011 | Tsuchida | G06F 40/30 706/12 |
| 2011/0282649 A1* | 11/2011 | Waksberg | G06F 17/248 704/8 |
| 2012/0197632 A1* | 8/2012 | Kominek | G10L 15/265 704/9 |
| 2013/0124439 A1* | 5/2013 | Yamamoto | G06F 40/295 706/12 |
| 2013/0246322 A1* | 9/2013 | De Sousa Webber | G06F 40/55 706/18 |
| 2016/0078020 A1* | 3/2016 | Sumita | G06F 17/289 704/9 |
| 2016/0110343 A1* | 4/2016 | Kumar Rangarajan Sridhar | G06F 40/30 704/9 |
| 2016/0179775 A1* | 6/2016 | Desai | G06F 17/2785 715/230 |
| 2016/0241499 A1* | 8/2016 | Hailpern | G06Q 10/107 |
| 2017/0127016 A1* | 5/2017 | Yu | G06K 9/00711 |
| 2017/0300565 A1* | 10/2017 | Calapodescu | G06F 16/3344 |
| 2017/0358295 A1* | 12/2017 | Roux | G06F 17/28 |
| 2018/0046912 A1* | 2/2018 | Kurata | G06N 3/0445 |
| 2018/0067923 A1* | 3/2018 | Chen | G06F 17/2705 |
| 2018/0067926 A1* | 3/2018 | Bestfleisch | G06F 17/289 |
| 2018/0075368 A1* | 3/2018 | Brennan | G06F 17/2785 |
| 2018/0114112 A1* | 4/2018 | Willson | G06F 17/276 |
| 2018/0150444 A1* | 5/2018 | Kasina | G06F 40/169 |
| 2018/0189272 A1* | 7/2018 | Noh | G06F 40/30 |
| 2018/0189387 A1* | 7/2018 | Kim | G06F 40/30 |

* cited by examiner

NATURAL LANGUAGE GENERATION OF SENTENCE SEQUENCES FROM TEXTUAL DATA WITH PARAGRAPH GENERATION MODEL

CROSS-REFERENCE TO RELATED APPLICATION

This application claims priority to and the benefit of Korean Patent Application No. 10-2016-0182289, filed on Dec. 29, 2016, the disclosure of which is incorporated herein by reference in its entirety.

BACKGROUND

1. Field

Embodiments of the present disclosure relate to natural language generation technologies.

2. Discussion of Related Art

Natural language generation (NLG) technologies are to generate a natural language that can be understood by a human from various pieces of data through a computer.

A conventional document generation method using the natural language generation technologies generally determines what sentences are arranged in what order, and generates and arranges actual sentences in accordance with the determined order. Although such a procedure is generally performed based on preset rules, it is very difficult to create rules with regard to all cases, and much time and labor are also needed in checking an error from the created rules.

SUMMARY

The present disclosure is directed to an apparatus and method for generating a natural language.

According to an aspect of the present disclosure, there is provided a method for generating a natural language, which is performed in a computing device including one or more processors, and a memory configured to store one or more programs to be executed by the one or more processors, the method including the operations of: receiving a plurality of pieces of data; generating a sentence ID sequence including one or more sentence IDs from the plurality of pieces of data; and generating a sentence corresponding to each of the sentence IDs included in the sentence ID sequence from the sentence ID sequence and the plurality of pieces of data.

The operation of generating the sentence ID sequence may generate the sentence ID sequence using a paragraph generation model based on a recurrent neural network.

The paragraph generation model may include a recurrent neural network model of an encoder-decoder structure including an encoder for generating a hidden state vector having a fixed length from the plurality of pieces of data, and a decoder for generating the sentence ID sequence from the hidden state vector.

The paragraph generation model may include a recurrent neural network model using a long short term memory (LSTM) unit or a gated recurrent unit (GRU) as a hidden layer unit.

The paragraph generation model may include a recurrent neural network model to which an attention mechanism is applied.

The operation of generating the sentence may generate the sentence by a sentence generation model based on a recurrent neural network.

The sentence generation model may include a recurrent neural network model of an encoder-decoder structure including an encoder for generating a hidden state vector having a fixed length from the plurality of pieces of data and one of the sentence IDs included in the sentence ID sequence and a decoder for generating the sentence from the generated hidden state vector.

The sentence generation model may include a recurrent neural network model using a long short term memory (LSTM) unit or a gated recurrent unit (GRU) as a hidden layer unit.

The sentence generation model may include a recurrent neural network model to which an attention mechanism is applied.

The sentence generation model may include a recurrent neural network model to which a copy mechanism is applied.

According to another aspect of the present disclosure, there is provided an apparatus for generating a natural language, the apparatus including: an inputter configured to receive a plurality of pieces of data; a paragraph generator configured to generate a sentence ID sequence including one or more sentence IDs from the plurality of pieces of data; and a sentence generator configured to generate a sentence corresponding to each of the sentence IDs included in the sentence ID sequence from the sentence ID sequence and the plurality of pieces of data.

The paragraph generator may generate the sentence ID sequence using a paragraph generation model based on a recurrent neural network.

The paragraph generation model may include a recurrent neural network model of an encoder-decoder structure including an encoder for generating a hidden state vector having a fixed length from the plurality of pieces of data, and a decoder for generating the sentence ID sequence from the hidden state vector.

The paragraph generation model may include a recurrent neural network model using a long short term memory (LSTM) unit or a gated recurrent unit (GRU) as a hidden layer unit.

The paragraph generation model may include a recurrent neural network model to which an attention mechanism is applied.

The sentence generator may generate the sentence by a sentence generation model based on a recurrent neural network.

The sentence generation model may include a recurrent neural network model of an encoder-decoder structure including an encoder for generating a hidden state vector having a fixed length from the plurality of pieces of data and one of the sentence IDs included in the sentence ID sequence and a decoder for generating the sentence from the generated hidden state vector.

The sentence generation model may include a recurrent neural network model using a long short term memory (LSTM) unit or a gated recurrent unit (GRU) as a hidden layer unit.

The sentence generation model may include a recurrent neural network model to which an attention mechanism is applied.

The sentence generation model may include a recurrent neural network model to which a copy mechanism is applied.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Below, embodiments of the present disclosure will be described with reference to the accompanying drawings. The detailed descriptions set forth herein are provided for better comprehensive understanding of a method, apparatus and/or system described in this specification. However, these are merely examples and not construed as limiting the present disclosure.

In describing the embodiments of the present disclosure, detailed descriptions about the publicly known art related to the present disclosure will be omitted when it is determined that the detailed descriptions may obscure the gist of the present disclosure. Further, terms used herein, which are defined by taking the functions of the present disclosure into account, may vary depending on users, intention of an operator, custom, etc. Therefore, the definition has to be based on contents given throughout the specification. The terms in the detailed descriptions are used just for describing the embodiments of the present disclosure and not restrictively used. Unless otherwise indicated, the terms have a singular form but a plural meaning. In the present disclosure, expressions such as "include" or "have" are to indicate certain features, numerals, operations, operations, elements, some of them or combination thereof, and are not construed as excluding presence or potentiality of one or more other certain features, numerals, operations, operations, elements, some of them or combination thereof.

Figure 1:
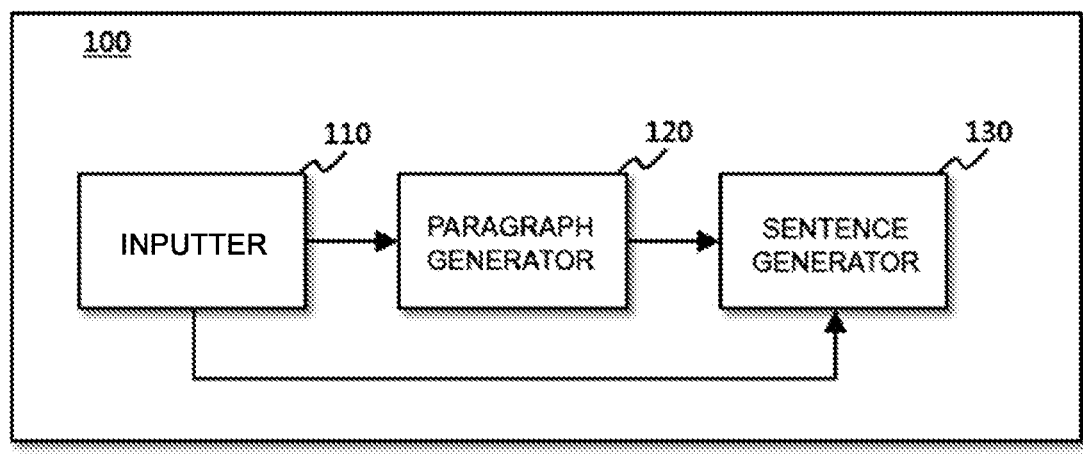
FIG. 1 is a diagram of a configuration of a natural language generation apparatus according to an embodiment of the present disclosure.

FIG. 1 is a diagram of a configuration of a natural language generation apparatus according to an embodiment of the present disclosure;

Referring to FIG. 1, a natural language generation apparatus 100 according to the embodiment of the present disclosure includes an inputter 110, a paragraph generator 120, and a sentence generator 130.

The inputter 110 receives a plurality of pieces of data.

In this case, the plurality of pieces of input data may include, for example, structured data stored in a structured form in a relational database. Further, the plurality of pieces of input data may include, for example, game records (e.g., winning teams, scores, stadiums, team names, etc.) of sports games, such as basketball, baseball, and the like, weather data (e.g., locations, temperature and rainfall according to locations, etc.) and the like, but not absolutely limited thereto. Besides the above examples, various kinds of data may be employed.

The paragraph generator 120 generates a sentence ID sequence, which includes one or more sentence IDs, from the plurality of pieces of input data.

According to an embodiment of the present disclosure, the paragraph generator 120 may generate a sentence ID sequence based on a paragraph generation model, which has been learned using training data having an input/output pair of a plurality of pieces of previously collected data and the sentence ID sequences corresponding to the plurality of pieces of previously collected data.

In this case, the sentence ID may refer to ID given in common to sentences having the same or similar meaning or sentences having a similar structure among the plurality of previously collected sentences. Detailed descriptions about the generation of the sentence ID sequence to be used in learning the paragraph generation model and the learning of the paragraph generation model using the same will be described below.

Meanwhile, according to the embodiment of the present disclosure, the paragraph generation model may be a recurrent neural network model.

Specifically, the paragraph generation model may be a recurrent neural network model of an encoder-decoder structure which includes an encoder for generating a hidden state vector having a fixed length from a plurality of pieces of input data, and a decoder for generating a sentence ID sequence including one or more sentence IDs from the generated hidden state vector.

Figure 2:
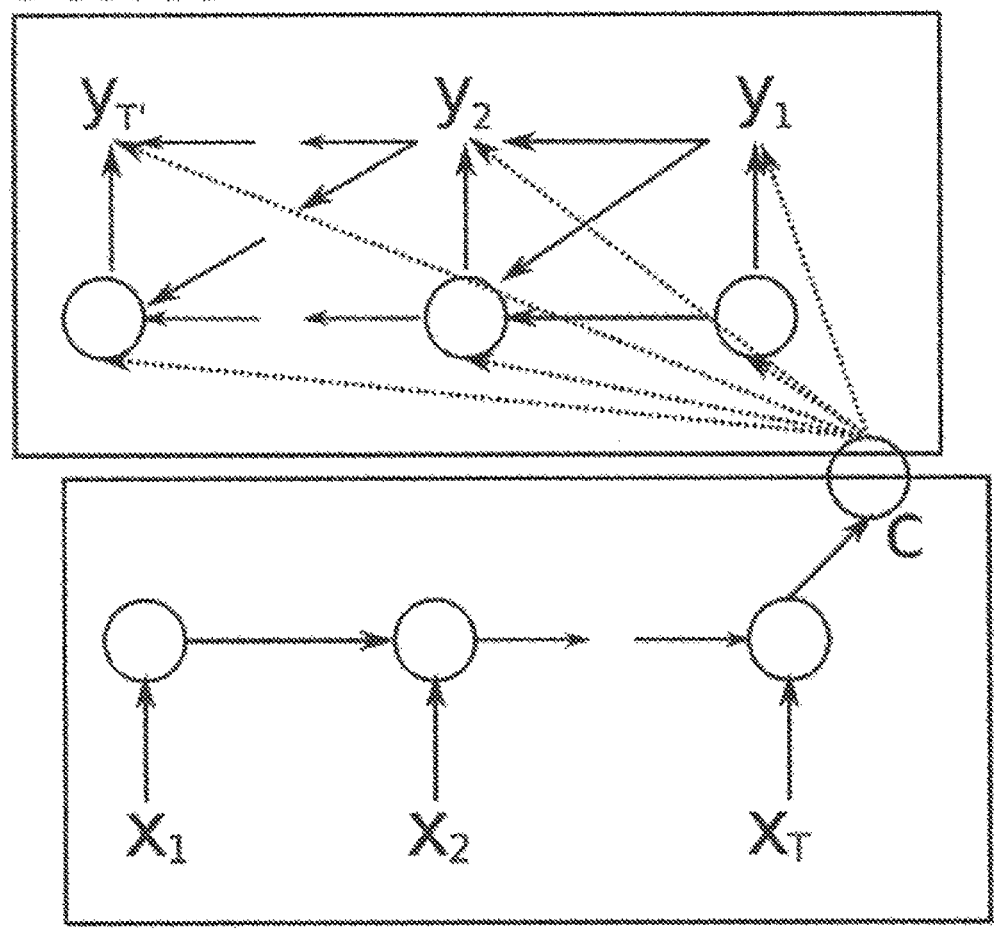
FIG. 2 is a diagram of showing a procedure of generating a sentence ID sequence using a recurrent neural network model of an encoder-decoder structure according to an embodiment of the present disclosure.

FIG. 2 is a diagram of showing a procedure of generating the sentence ID sequence using the recurrent neural network model of the encoder-decoder structure according to an embodiment of the present disclosure.

Referring to FIG. 2, first, the paragraph generator 120 may convert each piece of input data into embedding vectors $X_1$, $X_2$, and $X_T$ of a preset dimension. In this case, a word embedding technique, such as Word2vec, may be, for example, used to generate the embedding vector.

Then, the paragraph generator 120 may convert the embedding vectors $X_1$, $X_2$, and $X_T$ into a hidden state vector C by an encoding process in the encoder of the recurrent neural network model.

Then, the paragraph generator 120 may convert the hidden state vector C into embedding vectors $Y_1$, $Y_2$, and $Y_{T'}$ of a preset dimension, which are corresponding to specific the sentence IDs by a decoding process in the decoder of the recurrent neural network model.

Then, the paragraph generator 120 may generate the sentence ID sequence by converting the converted embedding vectors $Y_1$, $Y_2$ and $Y_{T'}$ into corresponding the sentence IDs. In this case, a word embedding technique, such as Word2vec, may be for example used to convert the embedding vectors $Y_1$, $Y_2$ and $Y_{T'}$ into the corresponding the sentence IDs.

Meanwhile, according to an embodiment of the present disclosure, the paragraph generation model may be a recurrent neural network model which employs a long short term memory (LSTM) unit or a gated recurrent unit (GRU) as a hidden layer unit of the encoder and the decoder of the recurrent neural network.

Further, according to an embodiment of the present disclosure, the paragraph generation model may be a recurrent neural network model to which an attention mechanism is applied.

Figure 3:
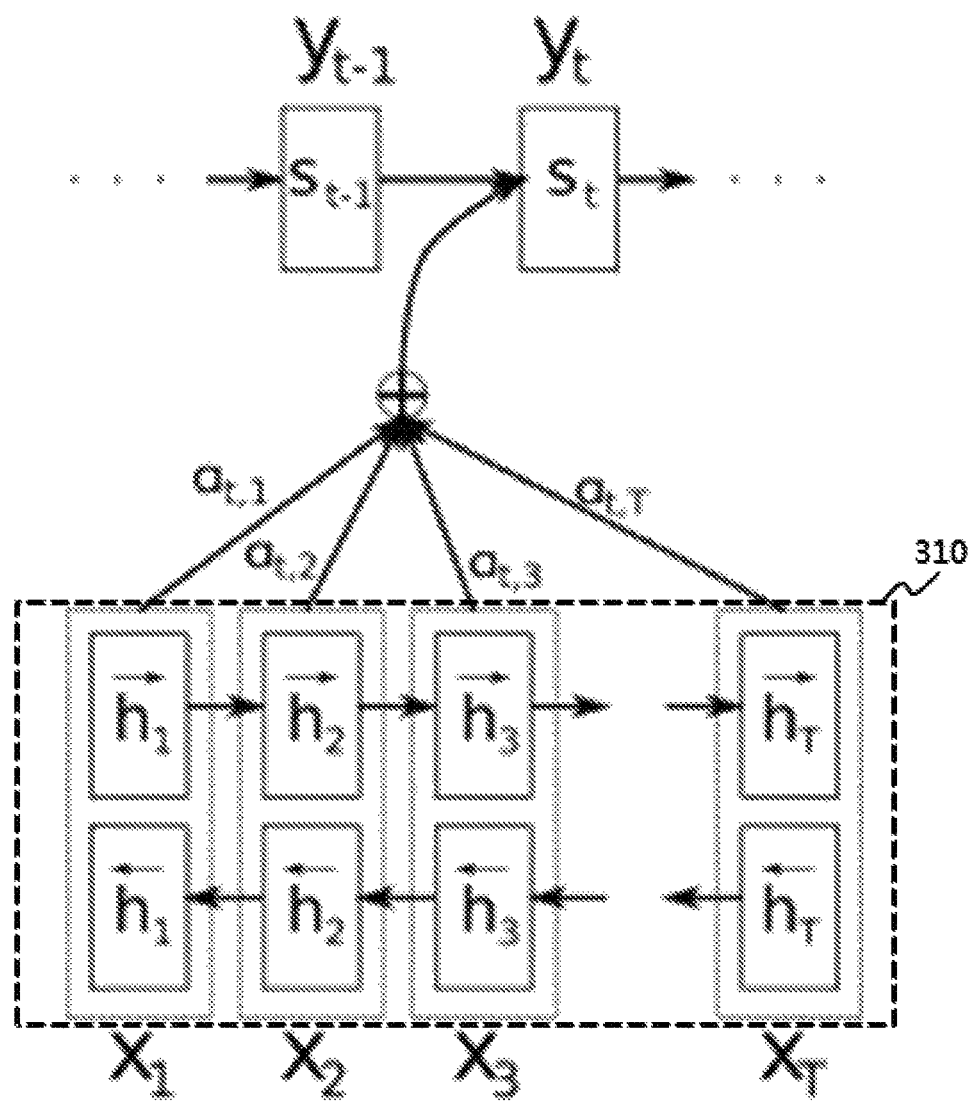
FIG. 3 is a diagram of an example for describing an attention mechanism.

Specifically, FIG. 3 is a diagram of an example for describing an attention mechanism.

Referring to FIG. 3, the recurrent neural network model to which the attention mechanism is applied is to place much more weight on inputs $X_1, X_2, X_3$ and $X_T$ related to an output $y_t$ at a current point of time t output from the decoder, in which the hidden state vector C for the output $y_t$ at the current point of time is not fixed but defined as a linear combination obtained by multiplying a hidden layer 310 output of the encoder by weights $\alpha_{t,1}, \alpha_{t,2}, \alpha_{t,3}$ and $\alpha_{t,T}$. In this case, the weights $\alpha_{t,1}, \alpha_{t,2}, \alpha_{t,3}$ and $\alpha_{t,T}$ show a relation to the output $y_t$ at the current point of time.

The sentence generator 130 generates a sentence corresponding to each of the sentence IDs included in the sentence ID sequence based on the sentence ID sequence generated by the paragraph generator 120 and the plurality of pieces of data input through the inputter 110.

Specifically, the sentence generator 130 may use a specific sentence ID included in the sentence ID sequence generated by the paragraph generator 120 and the plurality of pieces of data input through the inputter 110 to thereby generate a sentence corresponding to the specific sentence ID. Likewise, the paragraph generator 120 may generate a sentence corresponding to each of other sentence IDs included in the sentence ID sequence.

Meanwhile, according to an embodiment of the present disclosure, the sentence generator 130 may generate a sentence corresponding to each of the sentence IDs included in the sentence ID sequence based on the sentence generation model. In this case, the sentence generation model may be a model learned by the training data, in which the plurality of pieces of previously collected data and the previously generated sentence ID are used as the input, and the sentence corresponding to the plurality of pieces of data and the sentence IDs is used as the output.

Specifically, according to an embodiment of the present disclosure, the sentence generation model may be the recurrent neural network model of the encoder-decoder structure, which includes an encoder for generating a hidden state vector having a fixed length from an input sequence including one of sentence IDs included in a sentence ID sequence generated by the paragraph generator 120 and the plurality of pieces of data input to the inputter 110, and a decoder for generating a sentence from the generated hidden state vector.

Further, according to an embodiment of the present disclosure, the sentence generation model may be the recurrent neural network model which employs a long short term memory (LSTM) unit or a gated recurrent unit (GRU) as a hidden layer unit of the encoder and the decoder of the recurrent neural network.

Further, according to an embodiment of the present disclosure, the sentence generation model may be the recurrent neural network model to which an attention mechanism is applied.

Further, according to an embodiment of the present disclosure, the sentence generation model may be a recurrent neural network model to which a copy mechanism is applied. In this case, as one among methods of solving an error that may occur due to out of a vocabulary (OOV) which has not been learned, the copy mechanism refers to a mechanism that makes the OOV be directly included in a sentence generated by the recurrent neural network model when the OOV is involved in an input of the recurrent neural network model.

Figure 4:
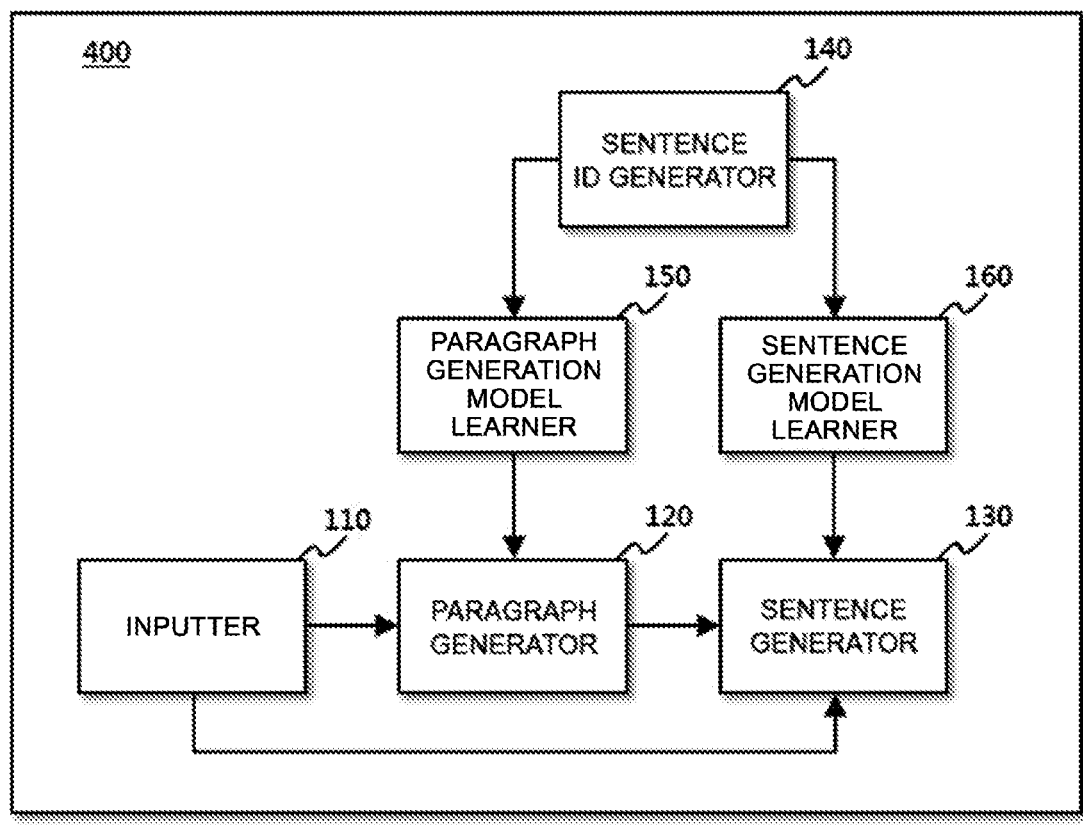
FIG. 4 is a diagram of a configuration of a natural language generation apparatus according to an additional embodiment of the present disclosure.

FIG. 4 is a diagram of a configuration of a natural language generation apparatus according to an additional embodiment of the present disclosure.

Referring to FIG. 4, a natural language generation apparatus 400 may further include a sentence ID generator 140, a paragraph generation model learner 150, and a sentence generation model learner 160.

The sentence ID generator 140 classifies sentences included in a plurality of previously collected paragraphs into one or more clusters, and assigns the same sentence ID to the sentences classified into the same cluster.

Figure 5:
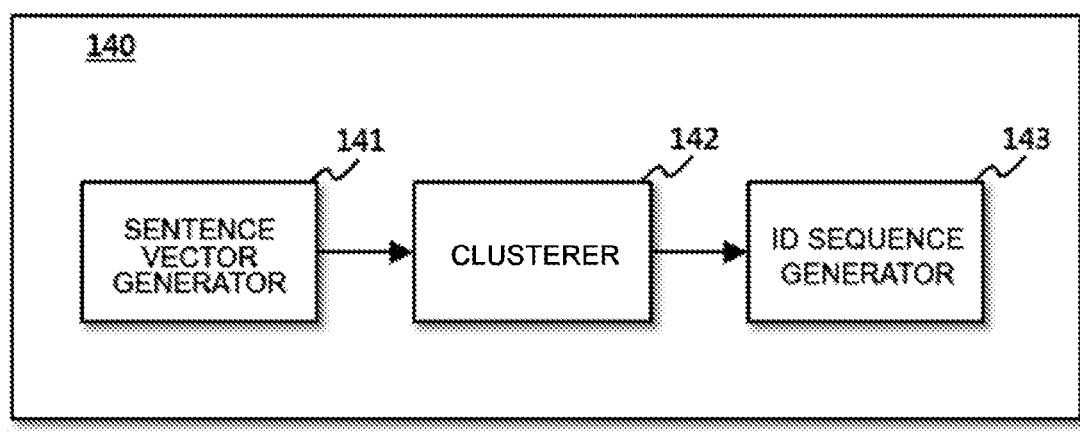
FIG. 5 is a diagram of showing a detailed configuration of a sentence ID generator according to an embodiment of the present disclosure.

Specifically, FIG. 5 is a diagram of showing a detailed configuration of the sentence ID generator 140 according to an embodiment of the present disclosure.

Referring to FIG. 5, the sentence ID generator 140 may include a sentence vector generator 141, a clusterer 142, and an ID sequence generator 143.

The sentence vector generator 141 may generate a sentence vector with respect to each of the sentences included in each of the plurality of previously collected paragraphs.

Specifically, according to an embodiment of the present disclosure, the sentence vector generator 141 may use the recurrent neural network model of the encoder-decoder structure, which includes an encoder for receiving one sentence and generating a hidden state vector having a fixed length, and a decoder for generating a sentence from the generated hidden state vector, thereby generating the sentence vector. Specifically, the sentence vector generator 141 generates the hidden state vector with regard to each sentence using the encoder of the recurrent neural network model, and employs the generated hidden state vector as the sentence vector for each sentence.

Meanwhile, the clusterer 142 may classify the sentences included in the plurality of paragraphs into one or more clusters based on the sentence vector generated in the sentence vector generator 141, and assign the same sentence ID to the sentences classified into the same cluster.

Specifically, according to an embodiment of the present disclosure, the clusterer 142 may classify the sentences included in the plurality of paragraphs into one or more clusters based on similarity between the sentence vectors.

For example, the clusterer 142 may employ a K-mean clustering algorithm based on cosine similarity between the sentence vectors to thereby classify the sentences included in the plurality of paragraphs into k clusters.

Alternatively, the clusterer 142 may employ an incremental clustering method, in which the number of clusters to be classified is not fixed, to thereby classify the sentences included in a plurality of documents into one or more clusters.

However, the clustering method of the sentences included in the plurality of documents is not absolutely limited to the above examples, and therefore various clustering methods may be employed besides the K-mean clustering and the incremental clustering.

The ID sequence generator 143 may employ the sentence ID of each sentence generated by the clusterer 142 to thereby generate the sentence ID sequence composed of sentence IDs assigned to the sentences included in each paragraph.

Figure 6:
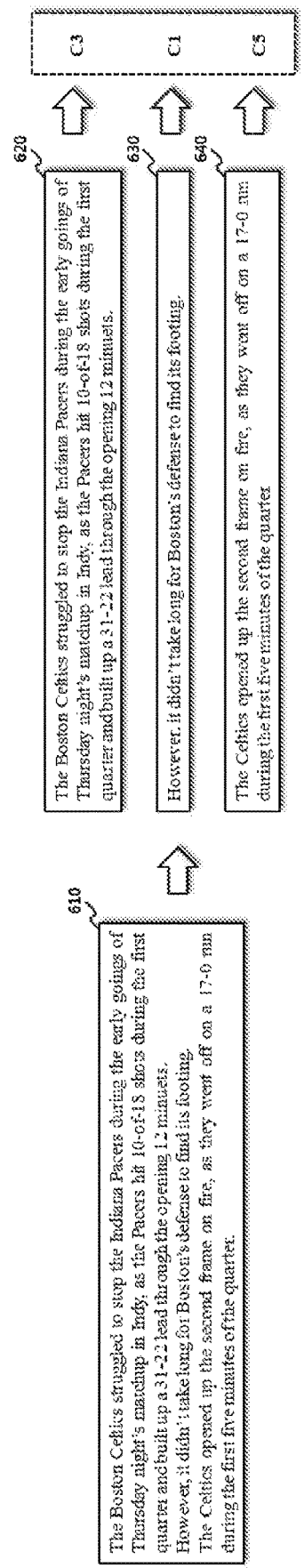
FIG. 6 is a diagram of an example of the sentence ID sequence generation according to an embodiment of the present disclosure.

For example, when it is assumed as shown in FIG. 6 that one paragraph 610 includes three sentences 620, 630, and 640 and the clusterer 142 assigns sentence IDs C3, C1, and C5 to the respective sentences 620, 630, and 640, the ID sequence generator 143 may generate {C3, C1, C5} as the sentence ID sequence for the paragraph 610.

Meanwhile, the paragraph generation model learner 150 may learn a parameter of the paragraph generation model using the training data having an input/output pair of a plurality of pieces of data related to a paragraph used for the sentence ID sequence generation in the sentence ID generator 140 and the sentence ID sequence about the corresponding paragraph. In this case, a back propagation algorithm may be for example used for the learning of the paragraph generation model.

Meanwhile, the plurality of pieces of data used for the learning of the paragraph generation model may be collected together with the paragraph collected for the sentence ID sequence generation in the sentence ID generator 130 or may be generated by a user. For example, when it is assumed that the collected paragraph is a paragraph of describing a game summary of a baseball game, data related to the corresponding paragraph may include game result data (for example, a winning team, scores, a game date, a starting pitcher, etc.) of the baseball game.

The sentence generation model learner 160 may learn a parameter of the sentence generation model using the training data, in which the plurality of pieces of data related to a paragraph used for the sentence ID sequence generation in the sentence ID generator 140 and the sentence ID assigned to one of the sentences included in the corresponding paragraph are used as the input, and the sentence with the assigned input sentence ID is used as the output. In this case, the back propagation algorithm may be for example used for the learning of the sentence generation model.

Meanwhile, according to an embodiment, the natural language generation apparatuses 100 and 400 shown in FIG. 1 and FIG. 4 may be materialized in a computing device that includes one or more processors and a computer readable recording medium connected to the processor. The computer readable recording medium may be internally or externally provided in the processor, and connected to the processor by various well-known means. The processor in the computing device may make each computing device operate according to exemplified embodiments described in this specification. For example, the processor may execute an instruction stored in the computer readable recording medium, and the instruction stored in the computer readable recording medium may be configured to make the computing device operate according to the exemplified embodiments described in this specification when it is executed by the processor.

Figure 7:
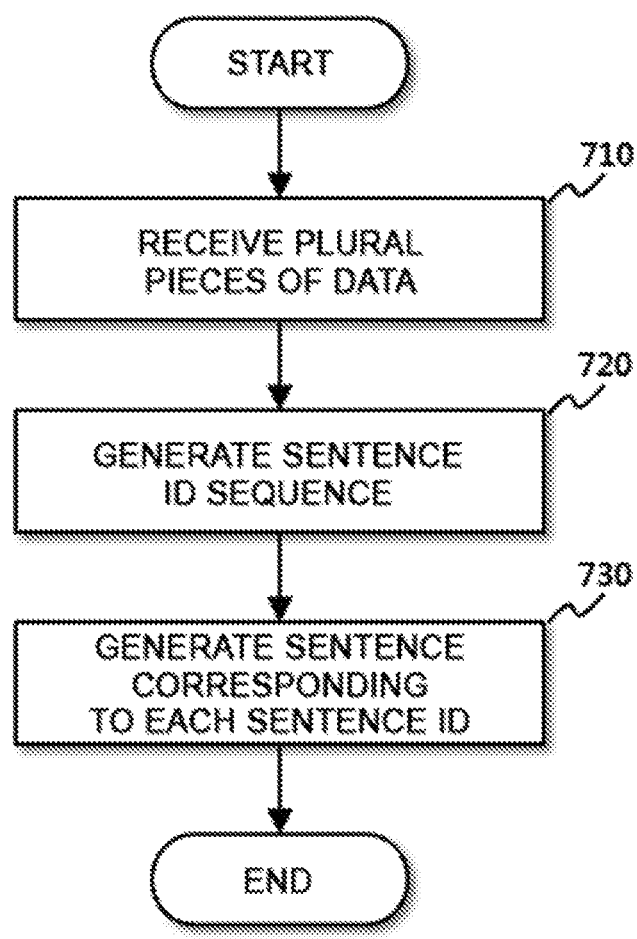
FIG. 7 is a flowchart of a method of generating a natural language according to an embodiment of the present disclosure.

FIG. 7 is a flowchart of a method of generating a natural language according to an embodiment of the present disclosure.

The method shown in FIG. 7 may be for example performed by the natural language generation apparatus 100 shown in FIG. 1.

Meanwhile, the flowchart of FIG. 7 shows the method divided into a plurality of operations, in which at least some operations may be reordered, performed in combination with another operation, omitted, divided into sub operations, or performed with added one or more operations (not shown).

Referring to FIG. 7, first, the natural language generation apparatus 100 receives a plurality of pieces of data (710).

Then, the natural language generation apparatus 100 generates a sentence ID sequence including one or more sentence IDs from the plurality of pieces of received data (720).

According to an embodiment of the present disclosure, the natural language generation apparatus 100 may generate the sentence ID sequence from the plurality of pieces of input data based on a paragraph generation model learned using training data having an input/output pair of a plurality of pieces of previously collected data and the sentence ID sequence corresponding to the plurality of pieces of data.

In this case, according to an embodiment of the present disclosure, the paragraph generation model may be a recurrent neural network model.

Specifically, according to an embodiment of the present disclosure, the paragraph generation model may be the recurrent neural network model of an encoder-decoder structure, which includes an encoder for generating a hidden state vector having a fixed length from the plurality of pieces of input data, and a decoder for generating the sentence ID sequence from the hidden state vector.

Meanwhile, according to an embodiment of the present disclosure, the paragraph generation model may be the recurrent neural network model using a LSTM unit or GRU as a hidden layer unit.

Further, according to an embodiment of the present disclosure, the paragraph generation model may be the recurrent neural network model to which an attention mechanism is applied.

Subsequently, the natural language generation apparatus 100 generates sentences corresponding to each of the sentence IDs included in the sentence ID sequence from the generated sentence ID sequence and the plurality of pieces of input data (730).

According to an embodiment of the present disclosure, the natural language generation apparatus 100 may generate a sentence corresponding to each sentence ID included in the sentence ID sequence based on the sentence generation model learned using the training data in which the plurality of pieces of previously collected data and the previously generated sentence IDs are used as the input and the sentence corresponding to the plurality of pieces of data and the sentence IDs is used as the output.

In this case, according to an embodiment of the present disclosure, the sentence generation model may be the recurrent neural network model.

Specifically, according to an embodiment of the present disclosure, the sentence generation model may be the recurrent neural network model of the encoder-decoder structure which includes the encoder for generating a hidden state vector having a fixed length from the plurality of pieces of data and one of the sentence IDs included in the sentence ID sequence, and the decoder for generating a sentence from the generated hidden state vector.

Meanwhile, according to an embodiment of the present disclosure, the sentence generation model may be the recurrent neural network model using the LSTM unit or GRU as the hidden layer unit.

Further, according to an embodiment of the present disclosure, the sentence generation model may be the recurrent neural network model to which the attention mechanism is applied.

Further, according to an embodiment of the present disclosure, the sentence generation model may be the recurrent neural network model to which the copy mechanism is applied.

Figure 8:
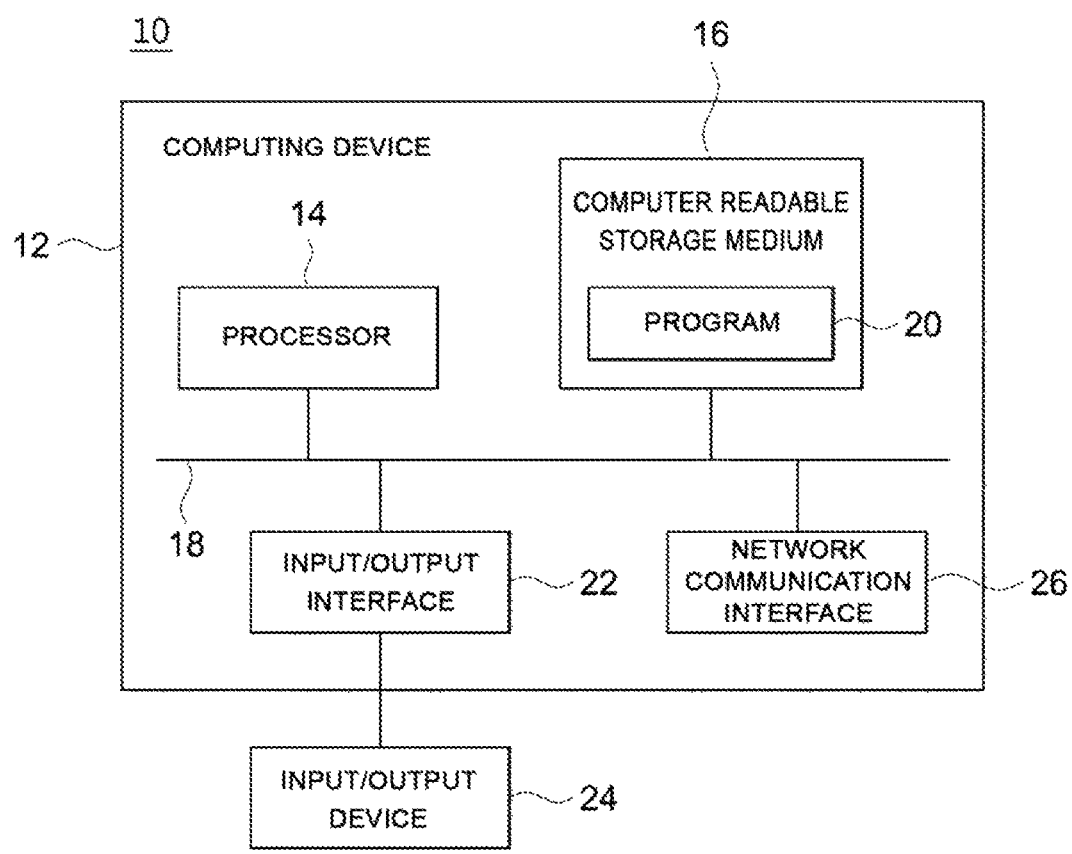
FIG. 8 is a block diagram for exemplifying and describing a computing environment including a computing device suitable to be used in exemplified embodiments of the present disclosure.

FIG. 8 is a block diagram for exemplifying and describing a computing environment 10 including a computing device suitable to be used in the exemplified embodiments. In the shown embodiments, respective components may have functions and abilities different from those of the following descriptions, and there may be another component in addition to those described in the following.

The shown computing environment 10 includes a computing device 12. According to an embodiment, the computing device 12 may include the natural language generation apparatuses 100 and 400 according to the embodiments of the present disclosure. The computing device 12 includes at least one processor 14, a computer readable storage medium 16, and a communication bus 18. The processor 14 may make the computing device 12 operate according to the above-mentioned exemplified embodiments. For example, the processor 14 may execute one or more programs stored in the computer readable storage medium 16. The one or more programs may include one or more computer executable instructions, and the computer executable instruction may be configured to make the computing device 12 operate according to the exemplified embodiments when it is executed by the processor 14.

The computer readable storage medium 16 is configured to store a computer executable instruction or program code, program data and/or information having other suitable forms. A program 20 stored in the computer readable storage medium 16 includes an instruction set executable by the processor 14. According to an embodiment, the computer readable storage medium 16 may include a memory (i.e., a volatile memory such as a random access memory, and a nonvolatile memory, or a proper combination thereof), one or more magnetic disk storage devices, optical disk storage devices, flash memory devices, other storage media accessed by the computing device 12 and configured to store desired information, or a proper combination thereof.

The communication bus 18 connects various components of the computing device 12, such as the processor 14 and the computer readable storage medium 16, with each other.

The computing device 12 may also include one or more input/output interfaces 22 of providing interfaces for one or more input/output devices 24, and one or more network communication interfaces 26. The input/output interface 22 and the network communication interface 26 are connected to the communication bus 18. The input/output device 24 may be connected to other components of the computing device 12 through the input/output interface 22. An exemplified input/output device 24 may include an input device such as a pointing device (e.g., a mouse, a trackpad, etc.), a keyboard, a touch input device (e.g., a touch pad, a touch screen, etc.), a voice or sound input device, various kinds of sensing devices, and/or a photographing device, and/or an output device such as a display device, a printer, a speaker, and/or a network card. The exemplified input/output device 24 may be internally provided in the computing device 12 as a component of the computing device 12, or may be provided separately from the computing device 12 and connected to the computing device 12.

Meanwhile, an embodiment of the present disclosure may include a computer readable recording medium including a program to implement the methods described in this specification on a computer. The computer readable recording medium may include a single or combination of a program command, a local data file, a local data structure, and the like. The medium may be specially designed and configured for the present disclosure, or may be typically available in a computer software field. The computer readable recording medium may include, for example, a magnetic medium such as a hard disk, a floppy disk, and a magnetic tape; an optical recording medium such as a compact disc read only memory (CD-ROM) and a digital versatile disc (DVD); a magnetic-optical medium such as a floppy disk; and a hardware device specially configured to store and execute a program command, such as a read only memory (ROM), a random access memory (RAM), a flash memory, etc. The program command may for example include not only a machine language code produced by a compiler, but also a high-level language code to be executable by a computer through an interpreter or the like.

According to embodiments of the present disclosure, it is possible to reduce time and labor in creating and checking rules as compared with those of the conventional rule-based natural language generation technologies because an arrangement of sentences for making a paragraph is determined using a model generated based on deep learning and the sentence is generated in accordance with the determined arrangement, and it is also possible to generate a sentence and a paragraph in various unstandardized forms since the arrangement of the sentences for making the paragraph and the generation of the sentence are stochastically generated by the learned model.

Although exemplary embodiments of the present disclosure have been described in detail, it will be appreciated by a person having an ordinary skill in the art that various changes may be made in the above exemplary embodiments without departing from the categories of the present disclosure, the scope of which is not limited to the above embodiments but defined in the following claims and their equivalents.

What is claimed is:

1. A method for generating a natural language, which is performed in a computing device comprising one or more processors and a memory configured to store one or more programs to be executed by the one or more processors, the method comprising:

receiving a plurality of pieces of textual data comprising structured data from one or more databases;

generating a sentence ID sequence including one or more sentence IDs from the plurality of pieces of textual data using a paragraph generation model; and generating a sentence corresponding to each of the one or more sentence IDs included in the generated sentence ID sequence, from the sentence ID sequence and the plurality of pieces of textual data, wherein the paragraph generation model is a model trained by using training data, the training data comprising a pair of previously collected pieces of textual data of a paragraph, as an input, and a sentence ID sequence obtained based on the previously collected pieces of textual data of the paragraph, as an output, and wherein sentence ID sequences included in the training data are obtained by:

classifying sentences included in previously collected paragraphs into clusters based on a similarity between sentence vectors corresponding to the sentences;

assigning a same sentence ID to sentences classified into a same cluster; and generating a sentence ID sequence comprising sentence IDs assigned to sentences included in each paragraph.

2. The method of claim 1, wherein the generating of the sentence ID sequence comprises generating the sentence ID sequence using the paragraph generation model based on a recurrent neural network.

3. The method of claim 2, wherein the paragraph generation model comprises a recurrent neural network model of an encoder-decoder structure, the encoder-decoder structure comprising an encoder for generating a hidden state vector having a fixed length from the plurality of pieces of textual data, and a decoder for generating the sentence ID sequence from the hidden state vector.

4. The method of claim 2, wherein the paragraph generation model comprises a recurrent neural network model using a long short term memory (LSTM) unit or a gated recurrent unit (GRU) as a hidden layer unit.

5. The method of claim 2, wherein the paragraph generation model comprises a recurrent neural network model to which an attention mechanism is applied.

6. The method of claim 1, wherein the generating of the sentence comprises generating the sentence by a sentence generation model based on a recurrent neural network.

7. The method of claim 6, wherein the sentence generation model comprises a recurrent neural network model of an encoder-decoder structure, the encoder-decoder structure comprising an encoder for generating a hidden state vector having a fixed length from the plurality of pieces of textual data and one of the one or more sentence IDs included in the sentence ID sequence, and a decoder for generating the sentence from the generated hidden state vector.

8. The method of claim 6, wherein the sentence generation model comprises a recurrent neural network model using a long short term memory (LSTM) unit or a gated recurrent unit (GRU) as a hidden layer unit.

9. The method of claim 6, wherein the sentence generation model comprises a recurrent neural network model to which an attention mechanism is applied.

10. The method of claim 6, wherein the sentence generation model comprises a recurrent neural network model to which a copy mechanism is applied, the copy mechanism being a mechanism that copies an unlearned out of vocabulary content, included in an input of the recurrent neural network model, to a generated sentence.

11. An apparatus for generating a natural language, the apparatus comprising:
an inputter configured to receive a plurality of pieces of textual data comprising structured data from one or more databases;
a paragraph generator configured to generate a sentence ID sequence comprising one or more sentence IDs from the plurality of pieces of textual data using a paragraph generation model; and
a sentence generator configured to generate a sentence corresponding to each of the one or more sentence IDs included in the generated sentence ID sequence from the sentence ID sequence and the plurality of pieces of textual data,
wherein the paragraph generation model is a model trained by using training data, the training data comprising a pair of previously collected pieces of textual data of a paragraph, as an input, and a sentence ID sequence obtained based on the previously collected pieces of textual data of the paragraph, as an output, and
wherein sentence ID sequences included in the training data are obtained by:
classifying sentences included in previously collected paragraphs into clusters based on a similarity between sentence vectors corresponding to the sentences;
assigning a same sentence ID to sentences classified into a same cluster; and
generating a sentence ID sequence comprising sentence IDs assigned to sentences included in each paragraph.

12. The apparatus of claim 11, wherein the paragraph generator is further configured to generate the sentence ID sequence using the paragraph generation model based on a recurrent neural network.

13. The apparatus of claim 12, wherein the paragraph generation model comprises a recurrent neural network model of an encoder-decoder structure, the encoder-decoder structure comprising an encoder for generating a hidden state vector having a fixed length from the plurality of pieces of textual data, and a decoder for generating the sentence ID sequence from the hidden state vector.

14. The apparatus of claim 12, wherein the paragraph generation model comprises a recurrent neural network model using a long short term memory (LSTM) unit or a gated recurrent unit (GRU) as a hidden layer unit.

15. The apparatus of claim 12, wherein the paragraph generation model comprises a recurrent neural network model to which an attention mechanism is applied.

16. The apparatus of claim 11, wherein the sentence generator is further configured to generate the sentence by a sentence generation model based on a recurrent neural network.

17. The apparatus of claim 16, wherein the sentence generation model comprises a recurrent neural network model of an encoder-decoder structure, the encoder-decoder structure comprising an encoder for generating a hidden state vector having a fixed length from the plurality of pieces of textual data and one of the one or more sentence IDs included in the sentence ID sequence, and a decoder for generating the sentence from the generated hidden state vector.

18. The apparatus of claim 16, wherein the sentence generation model comprises a recurrent neural network model using a long short term memory (LSTM) unit or a gated recurrent unit (GRU) as a hidden layer unit.

19. The apparatus of claim 16, wherein the sentence generation model comprises a recurrent neural network model to which an attention mechanism is applied.

20. The apparatus of claim 16, wherein the sentence generation model comprises a recurrent neural network model to which a copy mechanism is applied, the copy mechanism being a mechanism that copies an unlearned out of vocabulary content, included in an input of the recurrent neural network model, to a generated sentence.

* * * * *